United States Patent [19]

Baron et al.

[11] 4,145,373

[45] Mar. 20, 1979

[54] STRESS CRACK RESISTANT POLYCARBONATES

[75] Inventors: Arthur L. Baron; Parameswar Sivaramakrishnan, both of New Martinsville, W. Va.

[73] Assignee: Mobay Chemical Corporation, Pittsburgh, Pa.

[21] Appl. No.: 656,490

[22] Filed: Feb. 9, 1976

[51] Int. Cl.$^2$ .............................................. C08L 69/00
[52] U.S. Cl. .............................. 260/873; 260/22 CB; 528/196
[58] Field of Search ............ 260/873, 47 XA, 47 UA, 260/22 CB, 23 P

[56] References Cited

U.S. PATENT DOCUMENTS

| | | | |
|---|---|---|---|
| 2,991,273 | 7/1961 | Hechelhammer et al. | 260/47 |
| 2,999,835 | 9/1961 | Goldberg | 260/42 |
| 2,999,846 | 9/1961 | Schnell et al. | 260/49 |
| 3,028,365 | 4/1962 | Schnell et al. | 260/47 |
| 3,153,008 | 10/1964 | Fox | 260/47 |
| 3,187,065 | 6/1965 | McPhason et al. | 260/857 |
| 3,215,668 | 11/1965 | Bissinger et al. | 260/47 |
| 3,297,784 | 1/1967 | Snedeker et al. | 260/837 |
| 3,801,673 | 4/1974 | O'Connell | 260/873 |
| 3,880,783 | 4/1975 | Serini et al. | 260/873 X |
| 3,882,192 | 5/1975 | Elghani et al. | 260/873 |

FOREIGN PATENT DOCUMENTS 863411 2/1971 Canada.
2104575 8/1971 Fed. Rep. of Germany.
1548028 10/1968 France.

OTHER PUBLICATIONS

Briston et al., Plastics Films, (Wiley, 1974), p. 49.
Chem. Abs., 71:P13722c; 75:P130577c; 66:P38413n.

*Primary Examiner*—Thomas De Benedictis
*Attorney, Agent, or Firm*—Gene Harsh; Lawrence S. Pope

[57] ABSTRACT

Polycarbonates suitable for forming molded articles are comprised of a polycarbonate resin and 0.25 to 0.75 parts by weight per 100 parts of polycarbonate of an ethylene-vinylacetate copolymer. The articles molded from the polycarbonate resin with the ethylene-vinylacetate copolymer therein exhibit improved stress crack resistance.

4 Claims, No Drawings

STRESS CRACK RESISTANT POLYCARBONATES

BACKGROUND OF THE INVENTION

1. Field of the Invention

This invention relates to polycarbonates and more particularly to polycarbonates having improved stress crack resistance.

2. Description of the Prior Art

Polycarbonates derived from reactions involving organic dihydroxy compounds and carbonic acid derivatives have found extensive commercial application because of their excellent physical properties. These thermoplastic polymers are particularly suited for the manufacture of molded products where impact strength, rigidity, toughness and excellent electrical properties are required.

However, since polycarbonates have carbonic ester bonds, their resistance to hydrolysis, particularly when subjected to boiling water is not as good as might be desired, and the polymer often undergoes a molecular weight decrease accompanied by an excessive decrease in impact strength as well as becoming brittle. This problem becomes particularly acute when polycarbonate articles are used in the medical and surgical field necessitating sterilization in boiling water or dilute sodium hydroxide solution. As the polycarbonate molded article is sterilized after each use, its effective life span is reduced and stress cracks appear in the article. The stress cracks exemplify a brittleness in the molded article rendering the article inferior to those which are newly formed.

Polyolefin polymers have been blended with polycarbonate resins to raise the critical thickness of molded articles (See Canadian Pat. No. 863,411). However, these polymers do not show a substantial improvement in stress crack alleviation due to hydrolysis.

Thus in accordance with the invention a polycarbonate is provided which has improved resistance to hydrolysis during multiple sterilizations.

BRIEF DESCRIPTION OF THE INVENTION

A polycarbonate is provided with improved stress crack resistance after encountering sterilization conditions which tend to induce hydrolysis comprising a polycarbonate resin and 0.25 to 0.75 parts by weight of an ethylene-vinylacetate copolymer per 100 parts by weight polycarbonate resin.

DETAILED DESCRIPTION OF THE INVENTION

When used herein "polycarbonate resin" means the neat resin without additives; "Polycarbonate" means both the formulated polycarbonate resin with pigments, dyes and other additives.

The polycarbonate resins useful in practice of the invention are those having a weight average molecular weight from 10,000 to 200,000 and preferably a melt flow rate range of 1 to 24 grams/10 min (ASTM 1238) and are produced by reacting di-(monohydroxyaryl)-alkanes or dihydroxybenzenes and substituted dihydroxybenzenes with derivatives of the carbonic acids such as carbonic acid diesters, phosgene, bis-chloro-carbonic acid esters of di-(monohydroxyaryl)-alkanes and the bis-chloro-carbonic acid esters of the dihydroxybenzenes and the substituted dihydroxybenzenes.

The two aryl residues of the di-(monohydroxyaryl)-alkanes applied according to the invention can be alike or different. The aryl residues can also carry substituents which are not capable of reacting in the conversion into polycarbonates, such as halogen atoms or alkyl groups, for example, the methyl, ethyl, propyl or tert-butyl groups. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for example (4,4'-dihydroxy-diphenyl)-methane, 2,2'-(4,4'-dihydroxy-diphenyl)-propane, 1,1-(4,4'-dihydroxy-diphenyl)-cyclohexane, 1,1-(4,4'-dihydroxy-3,3'-dimethyl-diphenyl)-cyclohexane, 1,1-(2,2'-dihydroxy-4,4'-dimethyl-diphenyl)-butane, 2,2-(2,2'-dihydroxy-4,4'-di-tert.-butyl-diphenyl)-propane or 1,1'-(4,4'-dihydroxy-diphenyl)-1-phenyl-ethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane, 2,2-(4,4'-dihydroxy-diphenyl)-pentane (melting point 149°–150° C.), 3,3-(4,4'-dihydroxy-diphenyl)-pentane, 2,2-(4,4'-dihydroxy-diphenyl)-hexane, 3,3-(4,4'-dihydroxy-diphenyl)-hexane, 2,2-(4,4'-dihydroxy-diphenyl)-4-methylpentane, 2,2-(4,4'-dihydroxy-diphenyl)-heptane, 4,4-(4,4'-dihydroxy-diphenyl)-heptane (melting point 148°–149° C.) or 2,2-(4,4'-dihydroxy-diphenyl)-tri-decane. Suitable di-(monohydroxyaryl)-alkanes, the two aryl residues of which are different are, for example, 2,2-(4,4'-dihydroxy-3'-methyl-diphenyl)-propane and 2,2-(4,4'-dihydroxy-3-methyl-3'- isopropyl-diphenyl)-butane. Suitable di-(monohydroxyaryl)-alkanes, the aryl residues of which carry halogen atoms are for instance 2,2-(3,5,3',5'-tetrachloro-4,4'-dihydroxy-diphenyl)-propane, 2,2-(3,5,3',5'-tetrabromo-4,4'-dihydroxy-diphenyl)-propane, (3,3'-dichloro-4,4'-dihydroxy-diphenyl)-methane and 2,2'-dihydroxy-5,5'-difluoro-diphenyl-methane. Suitable di-(monohydroxyaryl)-alkanes, the alkyl residue of which, linking the two benzene rings, is substituted by an aryl residue are for instance (4,4'-dihydroxy-diphenyl)-phenyl-methane and 1,1-(4,4'-dihydroxy-diphenyl)-1-phenyl-ethane.

Suitable dihydroxybenzenes and substituted dihydroxbenzenes are hydroquinone, resorcinol, pyrocatecol, methyl hydroquinone and the like. Other suitable dihydroxyaromatic compounds are 4,4'-dihydroxy-diphenylene, 2,2'-dihydroxy-diphenylene, dihydroxy-naphthalene, dihydroxyanthracene and compounds represented by the structural formula:

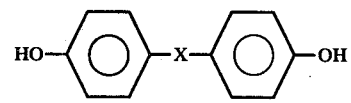

wherein X is S,

In order to obtain special properties, mixtures of various di-(monohydroxyaryl)-alkanes can also be used, thus mixed polycarbonate resins are obtained. By far the most useful polycarbonate resins are those based on 4,4'-dihydroxydiaryl methanes and more particularly bisphenol A [2,2-(4,4'-dihydroxy-diphenyl)-propane]. Thus when flame retardant characteristics are to be imparted to the basic polycarbonate resin, a mixture of bisphenol A and tetrabromobisphenol A [2,2-(3,5,3',5'-tetrabromo-4,4'-dihydroxy-diphenyl)-propane] is utilized when reacting with phosgene or a like carbonic acid derivative.

The polycarbonate resins are those prepared by methods known to those skilled in the art and more particularly by methods disclosed in U.S. Pat. Nos. 3,028,365, 2,999,846, 3,248,414, 3,153,008, 3,215,668, 3,187,065, 2,964,794, 2,970,131, 2,991,273 and 2,999,835 all incorporated herein by reference.

The ethylene-vinylacetate copolymers useful in the practice of the invention are the copolymers prepared from the copolymerization of ethylene and vinyl acetate having 15 to 55 percent by weight of vinyl acetate and more preferably 17 to 40 percent and are formed by either free radical or ionic polymerization techniques known to those skilled in the art. The ethylene-vinylacetate copolymers have a melt index of 1.2 to 350 and more preferably 2.1 to 42. The ethylene-vinylacetate copolymer is used at a level of 0.25 to 0.75 parts and preferably 0.4 to 0.6 parts by weight per 100 parts of polycarbonate resin. See "Encyclopedia of Polymer Science and Technology" Volume 15, 1971; pp 577–677 for typical methods of preparation of ethylene-vinylacetate copolymers.

The polycarbonates of this invention may be prepared in any suitable manner as meets the exigencies of the occasion and the equipment at hand as long as a thorough distribution of the ethylene-vinylacetate copolymer in the polycarbonate resin is obtained. The ethylene-vinylacetate copolymer may simply be added to the solution in which the polycarbonate resin is prepared either as such or in solution form, and the mixture which results may then be processed as usual in order to obtain uniform distribution of the additive in the polycarbonate. Any other suitable method may also be employed; for example, the mixing of the materials may be accomplished by a variety of methods normally employed for the incorporation of plasticizers or fillers into thermoplastic polymers including but not limited to extruders, dough mixers, Banbury mixers, and other mixing equipment. The resultant mixtures may be handled in any conventional manner employed for the fabrication or manipulation of thermoplastic resins. The materials may be formed or molded using compression, injection and extrusion techniques and the like.

One preferred method of blending the polycarbonate resin and ethylene-vinylacetate copolymer is blending the polycarbonate resin in either pellet or powder form in a tumble blender with either powdered or pelletized ethylene-vinylacetate copolymer. The tumble blend is passed through an extruder and cut into pellets. The pellets can then be molded into the desired shape to form the preferred article.

The polycarbonates may further contain any effective amount of any suitable additives such as stabilizers, anti-oxidants, dyes, pigments, fillers, $TiO_2$ or the like to lubricate, prevent oxidation or otherwise stabilize the polycarbonate or lend it color.

In addition to the improved stress crack resistance provided by the addition of the ethylene-vinylacetate copolymers to the polycarbonate, there are essentially no detrimental effects caused by the addition to detract from the normal desirable properties attributable to the polycarbonate.

The invention is further illustrated but is not intended to be limited by the following examples.

EXAMPLE I

A polycarbonate resin based on bisphenol A having a melt flow of 3–6 g/10 min at 300° C. (ASTM 1238) was tumble blended with 0.5 parts per 100 parts polycarbonate of an ethylene-vinylacetate copolymer having a melt index of 20 and a vinyl acetate unit content in the copolymer of 40 weight percent. The tumble blend was extruded in a single screw extruder having a compression ratio of 1.75 to 1. The blend was twice extruded to insure a homogeneous admixture of polycarbonate resin and ethylene-vinylacetate copolymer. The extrudate was cut into pellets and the pellets were injection molded into bars for testing. The samples were tested for impact properties, critical thickness and stress crack resistance. Stress crack resistance was tested by inserting a molded bar sample of size 3½" × ½" × 1/16" into a U shaped jig to apply stress to the sample. The sample in the jig was immersed in a 3.5% sodium hydroxide aqueous solution at 135° F., and checked for stress cracks at hourly intervals. The test results are reported on Table I along with the test results of the following examples.

EXAMPLES II–VI

Example I was repeated except the level and type of ethylene-vinylacetate copolymer was varied.

EXAMPLES VII AND VIII

Example I was repeated except a high and low density polyethylene was added to the polycarbonate instead of an ethylene-vinylacetate copolymer.

EXAMPLE IX (CONTROL)

Example I was repeated except no stress crack reducing additive was utilized.

TABLE I

| Example | Additive | Additive Concentration Parts by weight/100 pts polycarbonate resin | Melt Index of Ethylene vinyl acetate copolymer | Wt. % Vinyl Acetate units in copolymer | Stress Crack[1] Resistance Hours | Izod Impact[3] Ft-lbs/in ⅛" ¼" | Critical Thickness mils |
|---|---|---|---|---|---|---|---|
| I | EVA[2] | 0.5 | 20 | 40 | 5 | 16.7  3.5 | 215 |
| II | EVA | 0.5 | 5 | 33 | 9 | 16.3  12.9 | 208 |
| III | EVA | 0.5 | 2.1 – 2.9 | 17 – 19 | > 20 | 17.02  4.04 | 221 |
| IV | EVA | 0.5 | 5 – 7 | 27 – 29 | 13 | 15.61  5.99 | 237 |
| V | EVA | 0.5 | 39 – 42 | 39 – 42 | > 20 | 17.74  4.38 | 243 |
| VI | EVA | 0.25 | 5 | 33 | 9 | 16.34  3.32 | 208 |
| VI | Low Density Polyethylene | 0.5 | | | | | |
| VIII | High Density Polyethylene | 0.5 | | | | | |

TABLE I-continued

| Example | Additive | Additive Concentration Parts by weight/100 pts polycarbonate resin | Melt Index of Ethylene vinyl acetate copolymer | Wt. % Vinyl Acetate units in copolymer | Stress Crack[1] Resistance Hours | Izod Impact[3] Ft-lbs/in 1/8" 1/4" | Critical Thickness mils |
|---|---|---|---|---|---|---|---|
| IX | None | | | | 3 | 16.7  2.56 | 227 |

[1] Time in Hours at which first cracks appear.
[2] EVA = Ethylene-Vinyl acetate copolymer.
[3] 1/4" Izod impact results are reported as average of gate-end and dead-end values.

An examination of Table I readily demonstrates that an ethylene-vinylacetate copolymer when added to a polycarbonate resin substantially improves the stress crack resistance of articles molded therefrom. Additionally the ethylene vinyl acetate copolymer polycarbonate resin blend shows a substantial improvement over polycarbonate resins blended with polyolefins.

Although the invention has been described with reference to specific materials, the invention is only to be limited so far as is set forth in the accompanying claims.

What is claimed is:

1. A polycarbonate comprising an intimate admixture of a polycarbonate resin and 0.25 to 0.75 parts by weight of an ethylene-vinylacetate copolymer containing 17 to 40% by weight of polymerized vinylacetate units therein per 100 parts of said polycarbonate resin.

2. The polycarbonate of claim 1 wherein said ethylene-vinylacetate copolymer has a melt index between 2.1 and 42.

3. The polycarbonate of claim 1 wherein said polycarbonate resin is characterized by the repeating structural formula

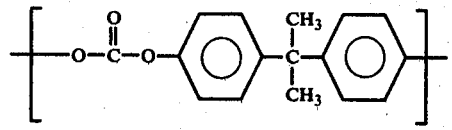

4. A polycarbonate consisting essentially of an intimate admixture of a polycarbonate resin and 0.25 to 0.75 parts by weight of an ethylene-vinylacetate copolymer containing 17 to 40% by weight of polymerized vinylacetate units therein per 100 parts of said polycarbonate resin.

* * * * *